US012680919B2

(12) United States Patent　　　(10) Patent No.: US 12,680,919 B2
Gonzalez et al.　　　　　　　　　(45) Date of Patent: Jul. 14, 2026

(54) METHODS TO OBTAIN A BIOLOGICAL SAMPLE REPRESENTATIVE OF A PASSENGER CABIN ON AN AIRCRAFT AUTOMATICALLY FROM THE COLLECTOR DEVICE

(71) Applicant: B/E AEROSPACE, INC., Winston Salem, NC (US)

(72) Inventors: Arnau Castillo Gonzalez, Maarssen (NL); Eric Surawski, Hebron, CT (US); Vanessa Gonzalez, Palma de Mallorca (ES); Antonio Martinez Murcia, Elche (ES)

(73) Assignee: B/E AEROSPACE, INC., Winston Salem, NC (US)

( * ) Notice: Subject to any disclaimer, the term of this patent is extended or adjusted under 35 U.S.C. 154(b) by 1243 days.

(21) Appl. No.: 17/518,356

(22) Filed: Nov. 3, 2021

(65) Prior Publication Data

US 2022/0057304 A1　　　Feb. 24, 2022

Related U.S. Application Data

(60) Provisional application No. 63/114,330, filed on Nov. 16, 2020, provisional application No. 63/114,339, filed on Nov. 16, 2020, provisional application No. 63/114,350, filed on Nov. 16, 2020, provisional application No. 63/114,064, filed on Nov. 16, 2020, (Continued)

(51) Int. Cl.
G01N 1/22　　　　(2006.01)
B64D 13/00　　　　(2006.01)
G01N 1/40　　　　(2006.01)

(52) U.S. Cl.
CPC .......... G01N 1/2247 (2013.01); B64D 13/00 (2013.01); G01N 1/2205 (2013.01); G01N 1/2273 (2013.01); G01N 1/40 (2013.01); G01N 2800/26 (2013.01)

(58) Field of Classification Search
CPC .................................................... G01N 1/2247
See application file for complete search history.

(56) References Cited

U.S. PATENT DOCUMENTS 6,468,330 B1　　10/2002　Irving et al.
7,390,339 B1　　6/2008　Warrick et al.
(Continued)

FOREIGN PATENT DOCUMENTS

CA　　　　3085280 A1 * 12/2020　............. B08B 13/00
CN　　　111891019 A * 11/2020　................ B60P 3/00
WO　　WO-2019227237 A1 * 12/2019　........... G01N 1/2247

OTHER PUBLICATIONS

McKernan et al. Monitoring microbial populations on wide-body commercial passenger aircraft. Ann. Occup. Hyg. 52(2):139-149 (2008). (Year: 2008).*

(Continued)

*Primary Examiner* — Samuel C Woolwine
(74) *Attorney, Agent, or Firm* — SNELL & WILMER L.L.P.

(57)　　　　　ABSTRACT

A system for monitoring aircraft air including a collector for collecting particulate samples positioned within at least one of an outlet flow path or a recirculation flow path, at least one of an outflow valve positioned in the outlet flow path downstream from the collector, and a retrieval device for retrieving the collector from the outflow valve.

9 Claims, 1 Drawing Sheet

Related U.S. Application Data provisional application No. 63/114,366, filed on Nov. 16, 2020, provisional application No. 63/114,157, filed on Nov. 16, 2020, provisional application No. 63/114,386, filed on Nov. 16, 2020, provisional application No. 63/114,400, filed on Nov. 16, 2020.

(56) References Cited

U.S. PATENT DOCUMENTS

| | | |
|---|---|---|
| 2004/0038385 A1 | 2/2004 | Langolis et al. |
| 2008/0177571 A1* | 7/2008 | Rooney .................. G16H 50/80 |
| | | 705/2 |
| 2009/0035770 A1 | 2/2009 | Mathies et al. |
| 2011/0159596 A1 | 6/2011 | Keinan et al. |
| 2012/0122075 A1 | 5/2012 | Call et al. |
| 2014/0370519 A1 | 12/2014 | Vangbo et al. |
| 2016/0025603 A1 | 1/2016 | Kindt et al. |
| 2017/0009290 A1 | 1/2017 | Ahmad et al. |
| 2019/0046985 A1 | 2/2019 | Kang et al. |
| 2020/0231081 A1* | 7/2020 | Coons ........................ B60P 3/00 |
| 2021/0316868 A1* | 10/2021 | Estable ................... B08B 13/00 |

OTHER PUBLICATIONS

Machine translation of CN111891019A. (Year: 2020).*

Extended European Search Report for European Patent Application No. EP21208622.7, dated Apr. 14, 2022.

Korves T.M., et al, "Bacterial communities in commercial aircraft high-efficiency particulate air (HEPA) filters assessed by PhyloChip analysis"; Indoor Air, vol. 23, No. 1, Jun. 8, 2012 (Jun. 8, 2012), pp. 50-61, XP055907740, DK; ISSN: 0905-6947, DOI: 10.1111/j.1600-0668.2012.00787.x; sections "Practical Implications"; "Materials and methods", "Aircraft and outdoor air samples"; first and second paragraph; "PCR amplification of 16S rRNA genes".

Extended European Search Report dated Apr. 13, 2022, issued during the prosecution of European Patent Application No. EP 21208619.3.

* cited by examiner

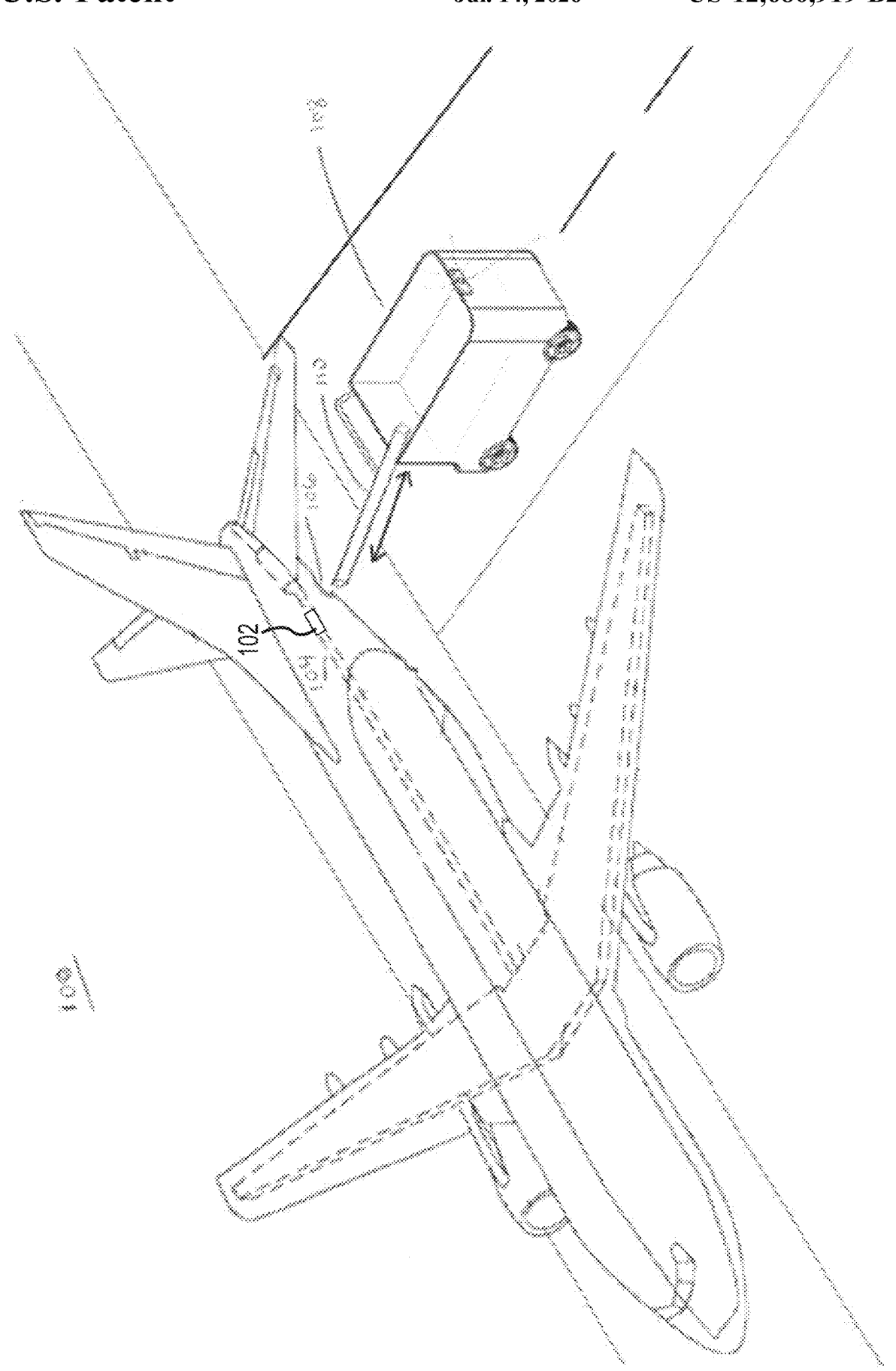

METHODS TO OBTAIN A BIOLOGICAL SAMPLE REPRESENTATIVE OF A PASSENGER CABIN ON AN AIRCRAFT AUTOMATICALLY FROM THE COLLECTOR DEVICE

PRIORITY CLAIM

The following application claims priority to U.S. Provisional Patent Applications with the following Ser. Nos. 63/114,330, 63/114,339, 63/114,350, 63/114,400, 63,114,064, 63/114,157, 63/114,386, 63/114,366 all filed on Nov. 16, 2020; and Patent Application Ser. No. 63/043,414 filed on Jun. 24, 2020 the contents of which are herein incorporated by reference in their entirety.

BACKGROUND

Technological Field

The present application is related to a system and method used collect a representative air sample of an aircraft, more specifically to a method and systems for collecting a biological sample on an aircraft using an automated collector.

Description of Related Art

The spread progression of SARS-CoV-2 around the world has risen a red flag: Economic economic globalization creates systemic risks. As trade, finance, travel, cyber and other networks grow in scale and interact, they become more complex and unstable. The transporters of the goods of the global economy, such as major airport hubs, are also spreaders of the pathogens. The 2008 global financial crisis provided a dramatic example of how contagions could spread from the US to global markets overnight. So too has the rapid spread of cyber viruses. In health, rising life expectancy and success in preventing a repeat of the devastating influenza pandemic of 1918, which infected about one-third of the world's population and killed as many as 50 m people, has created a false sense of security. But the world is now more interdependent. For example, China represents almost one-fifth of global output, is integral to global supply chains, and its tourists spend over $260 billion annually. The CovidCOVID-19CoVID-19 pandemic shed light on the need for better monitoring, detecting, and isolating ill passengers, specifically due to the havoc that was wreaked detrimental impact on the global economy, specifically air travel due to closed borders, movement restrictions, and testing requirements.

However, the COVIDCoVID-19 pandemic the air travel industry has proven that air travel can be safe and that aircraft cabins have a well-managed airflow that inhibits minimize the risk for transmission of virus, and that being seated onboard an aircraft is safer than shopping in large stores. Governments and other authorities need to assume that aircraft are contaminated until proven "clean", as 25% of COVID-19 cases are asymptomatic or pre-symptomatic; but still contagious. Thus, if borders shutdown and a drastic reduction in international travel global passenger travel is greatly reduced. To date travelers and governments have relied on individual diagnostic tests. The uncertainty of the results has reduced people's inclination to travel and subsequent airline inclination to maintain routes.

Accordingly, conventional systems and methods of monitoring infections has not lived up to requirements of the fast-paced modern world. Thus, there is still a need in the art for an improved on-board virus and pathogen detection system. The present disclosure provides a solution for this need.

SUMMARY OF THE INVENTION

A system for monitoring and collecting pathogens from aircraft air is disclosed. The system includes a collector for collecting particulate samples positioned within at least one of an outlet flow path or a recirculation flow path, at least one of an outflow valve positioned in the outlet flow path downstream from the collector, and a retrieval device for retrieving the collector from the outflow valve. The particulate samples can include droplets exhaled from passengers throughout a duration of a flight. The collector can include a filter material within the collector. The outlet flow path can be a main cabin outlet flow path and wherein the outflow valve is positioned within the outlet flow path, and where the collector is positioned upstream from the outflow valve to collect a cabin air particulate sample throughout the duration of a flight.

The retrieval device can be motorized, and include an arm for extending into the outflow valve to retrieve the collector. The retrieval device can be configured to be wirelessly controlled by a user remote to the retrieval device or to be driven and operated by a user onsite at the retrieval device.

A method for collecting particulates from aircraft air using the system described above includes capturing particulates in at least one of an outlet flow path or a recirculation flow path with a collector for a period of time, retrieving the collector from at least one of the outlet flow path or the recirculation flow path for testing by a user located at a location remote to the aircraft, and inserting a clean collector into at least one of the outlet flow path or the recirculation flow path for use during another period of time. The method can include a motorized vehicle to do the retrieval. The collector can be dispatched to a remote location to do the PCR testing or a PCR test can be done onboard the motorized vehicle. A result of the PCR test can be relayed to a central data center.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

FIG. 1 is a block diagram of the system for collecting an sample from the aircraft in accordance with the disclosure.

DETAILED DESCRIPTION

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. The global virus detection system described below is used to collect a bulk sample, representative of each passenger on the aircraft and to test it to provide a bulk screening of the aircraft upon arrival of the aircraft at a destination.

FIG. 1 shows a system 100 for retrieving a collected sample from an aircraft. The system 100 includes a vehicle 108 for collecting particulate samples from a collector 102 positioned within at least one of an outlet flow path 104 or a recirculation flow path, at least one of an outflow valve 106 positioned in the outlet flow path downstream from the collector 102. The particulate samples that are collected can include droplets exhaled from passengers throughout a duration of a flight. The retrieval device 108 can be motorized, and include an arm 110 for extending into the outflow valve 106 to retrieve the collector 102. The arm 110 is shown extended into the outflow valve 106. The retrieval device 108 can be configured to be wirelessly controlled by a user remote to the retrieval device or to be driven and operated by a user onsite at or within the retrieval device 108.

A method for collecting particulates from aircraft air using the system described above includes capturing particulates in at least one of an outlet flow path or a recirculation flow path with a collector for a period of time, retrieving the collector from at least one of the outlet flow path or the recirculation flow path for testing by a user located at a location remote to the aircraft, and inserting a clean collector into at least one of the outlet flow path or the recirculation flow path for use during another period of time. The method can include a motorized vehicle to do the retrieval. The collector can be dispatched to a remote location to do the PCR testing or a PCR test can be done onboard the motorized vehicle. A result of the PCR test can be relayed to a central data center.

The methods and systems of the present disclosure, as described above and shown in the drawings, provide for an improved bulk data and analysis of passenger pathogens on an aircraft. The system provides a more efficient primary health controls at airports, helps identify at early stages surging pathogens and origin, and empower their scientific research (either academic and/or commercial/institutional).

While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system for monitoring aircraft air comprising:
a collector for collecting particulate samples positioned within an outlet flow path;
an outflow valve positioned in the outlet flow path downstream from the collector; and
a retrieval device for retrieving the collector from the outflow valve.

2. The system of claim 1, wherein the collector includes a filter material.

3. The system of claim 1, wherein the retrieval device is motorized.

4. The system of claim 1, wherein the retrieval device includes an arm for extending into the outflow valve to retrieve the collector.

5. The system of claim 4, wherein the arm is extendable.

6. The system of claim 1, wherein the collector includes an adaptor and a filter material operatively connected to the adaptor.

7. The system of claim 1, wherein the retrieval device is configured to be wirelessly controlled by a user remote to the retrieval device.

8. The system of claim 1, wherein the retrieval device is configured to be driven and operated by a user onsite at the retrieval device.

9. The system of claim 1, wherein the outlet flow path is a main cabin outlet flow path and wherein the outflow valve is positioned within the main cabin outlet flow path; and wherein the collector is positioned across the main cabin outlet flow path upstream from the outflow valve to collect a cabin air particulate sample throughout a duration of a flight.

* * * * *